United States Patent [19]

Noguchi et al.

[11] Patent Number: 4,471,906

[45] Date of Patent: Sep. 18, 1984

[54] THERMOSTATICALLY CONTROLLED TRAP

[75] Inventors: Keiichi Noguchi; Masahumi Minami; Mutsushi Muramoto, all of Osaka, Japan

[73] Assignee: Miyawaki Steam Trap Mfg. Co., Ltd., Osaka, Japan

[21] Appl. No.: 184,327

[22] Filed: Sep. 5, 1980

[30] Foreign Application Priority Data

Sep. 25, 1979 [JP] Japan .................................. 54-123449

[51] Int. Cl.³ .............................................. F16T 1/04
[52] U.S. Cl. ................................... 236/59; 236/93 R; 236/101 B
[58] Field of Search ................. 236/59, 101 B, 101 E, 236/93 R

[56] References Cited

U.S. PATENT DOCUMENTS 3,362,636 1/1968 Miyakawi .............................. 236/59
4,060,193 11/1977 Foller .................................... 236/59

FOREIGN PATENT DOCUMENTS 402490 10/1909 France .................................... 236/59
980926 1/1965 United Kingdom .................. 236/59

Primary Examiner—William L. Tapolcai
Attorney, Agent, or Firm—Wenderoth, Lind & Ponack

[57] ABSTRACT

A thermostatically controlled trap provided that one end of a valve pushrod comes in direct contact with a ball valve when the valve pushrod is subjected to axial motion by the expansion of a thermosensitive member caused by a change in the temperature of a fluid flowing through the trap.

2 Claims, 2 Drawing Figures 4,471,906

THERMOSTATICALLY CONTROLLED TRAP

BACKGROUND OF THE INVENTION

The present invention relates to a thermostatically controlled trap.

A thermostatically controlled trap has so far been considered unfit for use in a trace pipe or in a piping for instrumentation where only a very small amount of condensate is produced and the pressure and temperature of the fluid are subject to sharp fluctuations.

SUMMARY OF THE INVENTION

It is an object of the present invention to provide a thermostatically controlled trap which works in a stable manner even in such a piping.

With the above-mentioned object in view and as will become apparent from the following detailed description, the present invention will be more clearly understood in connection with the accompanying drawings.

DETAILED DESCRIPTION OF THE INVENTION

Figure 1:
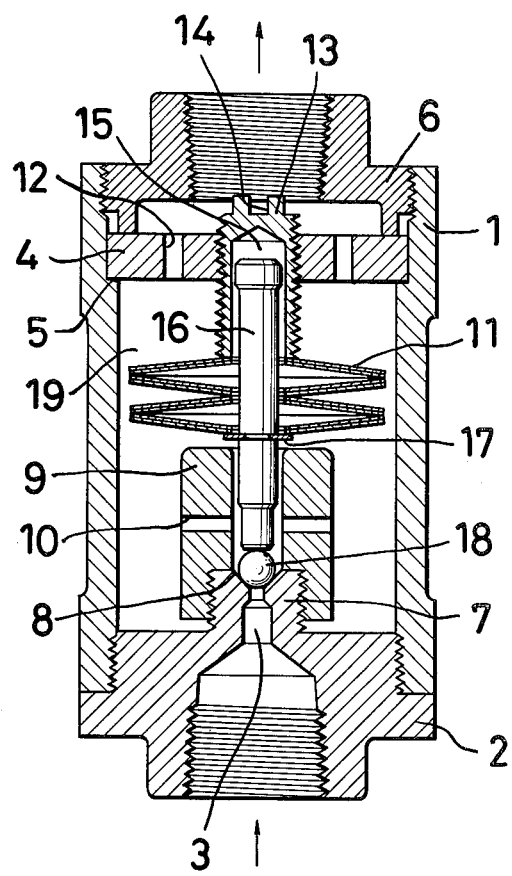
FIG. 1 is a cross-sectional view of a trap according to the present invention with the valve closed.

Referring now to FIG. 1, a trap in accordance with the present invention includes a barrel 1, a pipe joint 2 which is provided with an inlet port 3 coaxially with the barrel 1 and screwed into the lower end of the barrel 1 for connecting an inlet pipe, a disk 4 resting on an annular shoulder 5 formed on the internal surface of the barrel 1 near the upper brim thereof, and having a hole in its center, another pipe joint 6 screwed into the upper end of the barrel 1 for connecting an outlet pipe and adapted to hold the disk 4 against the annular shoulder 5, and an adjusting bolt 13 having a head with a slot or recess 14 and screwed into the center hole of the disk 4.

The inlet port 3 extends through a projection 7 which is provided at the top center of the pipe joint 2 coaxially therewith. A conical valve seat 8, on which a ball valve 18 rests, is formed on the upper brim of the projection 7.

An extension pipe 9 is screwed on the projection 7 coaxially therewith. A plurality of radial holes 10 are provided through the wall of the extension pipe 9 in the midportion thereof with angularly equal spacings.

The disk 4, which defines a chamber 19 together with the barrel 1 and the pipe joint 2, is provided with a plurality of holes 12 axially extending with angularly equal spacings.

The adjusting bolt 13 has a blind hole 15 opening downwardly. The blind hole 15 is axially alined with the extension pipe 9. Slidably disposed in the extension pipe 9 and the blind hole 15 is a valve pushrod 16, the lower end of which is of a reduced diameter to assure smooth flow of water through the inlet port 3 and the holes 10.

A ring 17 is fixed on the valve pushrod 16 at a position between the upper brim of the extension pipe 9 and the lower brim of the adjusting bolt 13.

A thermosensitive member 11 made of laminated bimetal fits on the valve pushrod 16 with its upper end abutting the lower brim of the adjusting bolt 13 and its lower end abutting the ring 17.

In the alternative, the member 11 may be a bellows containing a thermosensitive liquid which expands and contracts with the change in temperature.

The valve pushrod 16 has a plane surface at the lower end and comes in direct contact with the ball valve 18 when the valve pushrod 16 is subjected to axial motion by the expansion of the member 11.

Figure 2:
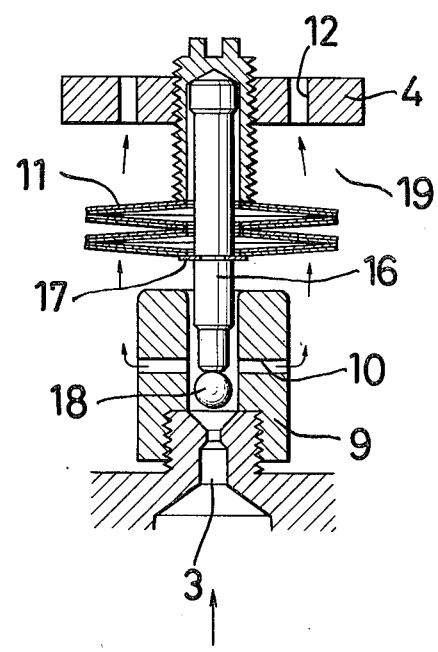
FIG. 2 is a cross-sectional view of a part thereof with the valve opened.

In operation, as long as the temperature of the fluid arriving at the inlet port 3 is below a set value, the thermosensitive member 11 continues to be in a constricted state as shown in FIG. 2 so that the valve pushrod 16 is held in a lifted position enabling ball valve 8 to be lifted off the valve seat 8. The fluid pressure continues to push up the ball valve 18 so as to permit the flow of the fluid.

When a fluid at a temperature above the set value flows into the chamber 19, the member 11 expands, pushes down the valve pushrod 16, and allows it to press the ball valve 18 against the valve seat 8 so as to block the flow of the fluid.

When the temperature of the fluid in the chamber 19 falls below the set value, the member 11 contracts again into the state shown in FIG. 2 and permits the fluid to flow through the trap.

Since the ball valve 18 is light in weight, it is freely rotated even by a very small amount of the fluid flowing through the inlet port 3. The rotation of the ball valve 18 prevents scale from being deposited not only on the surface of the ball valve 18 but also on the surface of the valve seat 8, because the ball valve 18 sometimes rotates while keeping in touch with the valve seat 8.

The holes 10 and 12 allow the entire surface of the member 11 to come into uniform contact with the fluid so as not to cause a time lag in the operation of the member 11 in response to a change in the fluid temperature. In addition, because the expansion and contraction of the member 11 is not abrupt, a sudden closure of the ball valve 18, a sharp pressure change at the inlet side and the "water hammer" effect can be avoided.

For adjusting the position of the adjusting bolt 13 with relationship to the extension pipe 9, the adjusting bolt 13 is turned with a screwdriver in the slot or recess 14 in its head.

The contact between the lower end of the pushrod and the ball valve is maintained even if the ball valve is out of alignment with the pushrod.

While there has been disclosed a preferred embodiment of the present invention, it is to be understood that it has been described by way of example only, various other modifications being obvious.

What I claim is:

1. A thermostatically controlled trap for regulating the flow of a fluid which is subject to pressure and temperature fluctuations, said trap comprising:
   a barrel having upper and lower ends;
   a first pipe joint fastened to said lower end of said barrel and adapted to be connected to a fluid inlet pipe, said first pipe joint having a coaxially centered projection extending upwardly into said barrel, an inlet port extending upwardly through said projection for directing fluid inwardly from the fluid inlet pipe, and a conical valve seat formed around said inlet port at an upper surface of said projection;
   an extension pipe fastened to said projection and having extending through a midportion thereof a plurality of radial holes for directing fluid from said inlet port into the interior of said barrel;

a second pipe joint fastened to said upper end of said barrel and adapted to be connected to a fluid outlet pipe;

a disk fastened within said barrel at a position beneath said second pipe joint, said disk having therethrough a plurality of axial holes for directing fluid from said interior of said barrel to said second pipe joint, and said disk having therethrough an axial center hole;

an adjusting bolt adjustably extending through said center hole of said disk, said adjusting bolt having a downwardly directed blind hole;

a ball valve positioned within said extension pipe to seat on said valve seat to block the flow of fluid through said inlet port and to be spaced from said valve seat to enable flow of fluid through said inlet port;

a valve pushrod slidably disposed in said extension pipe and said blind hole of said adjusting bolt, said pushrod having a lower end contacting said ball valve; and thermosensitive means for, upon said fluid being at a temperature below a predetermined value, moving said pushrod upwardly to a position whereat said fluid passing upwardly through said inlet port moves said ball valve upwardly away from said valve seat, and for, upon said fluid being at a temperature above said predetermined value, moving said pushrod downwardly to a position whereat said pushrod seats said ball valve on said valve seat, thereby blocking the flow of said fluid through said inlet port.

2. A trap as claimed in claim 1, wherein said thermosensitive means comprises a ring fixed to said pushrod at a position between the upper surface of said extension pipe and the lower surface of said adjusting bolt, and a thermosensitive member formed of laminated bimetal and fitted over said pushrod, said thermosensitive member having an upper end abutting said lower surface of said adjusting bolt and a lower end abutting said ring, said thermosensitive member being axially contractible when said fluid is below said predetermined temperature value and axially expandible when said fluid is above said predetermined temperature value.

* * * * *